US009251980B2

(12) United States Patent
Asokan et al.

(10) Patent No.: US 9,251,980 B2

(45) Date of Patent: Feb. 2, 2016

(54) APPARATUS FOR INTERRUPTING CURRENT

(75) Inventors: Thangavelu Asokan, Bangalore (IN); Thomas Frederick Papallo, Jr., Farmington, CT (US); Govardhan Ganireddy, Bangalore (IN)

(73) Assignee: General Electric Company, Niskayuna, NY (US)

(*) Notice: Subject to any disclaimer, the term of this patent is extended or adjusted under 35 U.S.C. 154(b) by 291 days.

(21) Appl. No.: 13/006,895

(22) Filed: Jan. 14, 2011

(65) Prior Publication Data

US 2012/0181253 A1 Jul. 19, 2012

(51) Int. Cl.

| | |
|---|---|
| ***H02H 3/00*** | (2006.01) |
| ***H01H 33/59*** | (2006.01) |
| ***H01H 9/54*** | (2006.01) |
| *H01H 9/38* | (2006.01) |

(52) U.S. Cl.

CPC ............ *H01H 33/596* (2013.01); *H01H 9/542* (2013.01); *H01H 9/38* (2013.01)

(58) Field of Classification Search

USPC .......................................................... 361/2

See application file for complete search history.

(56) References Cited

U.S. PATENT DOCUMENTS

| | | | | |
|---|---|---|---|---|
| 3,435,288 | A | 3/1969 | Greenwood | |
| 3,585,449 | A | 6/1971 | Dethlefsen | |
| 5,138,122 | A | 8/1992 | Moldovan et al. | |
| 5,877,464 | A | 3/1999 | Moldovan | |
| 6,064,024 | A | 5/2000 | Moldovan | |
| 6,100,491 | A | 8/2000 | Moldovan | |
| 6,430,018 | B1 * | 8/2002 | Machida | 361/120 |
| 6,700,466 | B1 | 3/2004 | Yamamoto et al. | |
| 6,809,282 | B2 | 10/2004 | Fasano | |
| 7,518,477 | B2 * | 4/2009 | Martin et al. | 335/201 |
| 7,929,260 | B2 * | 4/2011 | Roscoe et al. | 361/2 |
| 2008/0239592 | A1 | 10/2008 | Roscoe et al. | |

FOREIGN PATENT DOCUMENTS

| | | | |
|---|---|---|---|
| DE | 2851522 | A1 | 5/1980 |
| EP | 1376633 | A1 | 1/2004 |

OTHER PUBLICATIONS

Lutz et al., "The Gamitron—A High Power Crossed-Field Switch Tube for HVDC Interruption", IEEE Transactions on Plasma Science, vol. 2, Issue 1, pp. 11-24, Mar. 1974.

Wilson, "Higher-Order Corrections to the Theory of the Guiding Center Plasma", The Physics of Fluids, vol. 12, No. 8, pp. 1673-1683, Aug. 1969.

Fischer et al., "Magnetic Topology and Guiding Center Drift Orbits in a Reversed Shear Tokamak", LRP 636/99, 21 pages, Jun. 1999.

(Continued)

*Primary Examiner* — Thienvu Tran

*Assistant Examiner* — Tien Mai

(74) *Attorney, Agent, or Firm* — Seema S. Katragadda

(57) ABSTRACT

In one aspect, an apparatus, such as an electrical system, is provided. The electrical system can include a pair of conductors across which an arc is sporadically supported, the arc including load current from a load circuit. The electrical system can also include an energy source that is separate from the load circuit and configured to selectively charge an electrode assembly. The conductors and electrode assembly can be configured such that the arc, when present, will be lengthened or constricted due to the charge on the electrode assembly.

19 Claims, 6 Drawing Sheets

(56) References Cited

OTHER PUBLICATIONS

Search Report and Written Opinion from corresponding EP Application No. 12150849.3-2214 dated May 4, 2012.

Office Action issued in connection with corresponding CN Application No. 201210020562.3 on Dec. 2, 2014.

* cited by examiner

APPARATUS FOR INTERRUPTING CURRENT

BACKGROUND

Embodiments presented herein generally relate to electrical switches, and more particularly to current interrupters for electrical switches.

The use of direct current (DC) power distribution has expanded during the last decade, involving application spaces such as, for example, data centers, solar farms, aviation, and rail. However, there is presently a dearth of suitable DC circuit protection technologies, including DC circuit breakers. Current DC circuit breakers are often based on solid state switches, magnetic switches, and/or de-rated alternating current (AC) circuit breakers. All of these devices tend to be relatively bulky and expensive, as well as possessing a limited short circuit capability and poor contact reliability.

BRIEF DESCRIPTION

In one aspect, an apparatus, such as an electrical system, is provided. The electrical system can include a pair of conductors across which an arc is sporadically supported, the arc including load current from a load circuit. The electrical system can also include an energy source that is separate from the load circuit and configured to selectively charge (e.g., selectively provides a high voltage pulse to) an electrode assembly. The conductors and electrode assembly can be configured such that the arc, when present, will be lengthened due to the charge on the electrode assembly. For example, the electrical system can include an indication device operatively coupled to the energy source, with the energy source being configured to charge the electrode assembly in response to receiving from the indication device an indication of the arc being established the indication.

In some embodiments, the electrode assembly can include a pair of electrodes disposed on opposing sides of a gap defined between the conductors. In some embodiments, the electrode assembly can include an electrode that is centered along, and laterally offset from, an axis defined between the conductors.

The conductors may be configured to move into and out of contact with one another so as to respectively close or open at least a portion of the load circuit. In some embodiments, the electrical system can include a pair of contacts configured to move into and out of contact with one another so as to respectively close or open at least a portion of the load circuit. Each of the conductors can be electrically connected to a respective one of the contacts, and the conductors can be configured to receive therebetween the arc from the contacts subsequent to the arc being established between the contacts. An arc transfer device, such as one including an ablative plasma gun, can be configured to urge the arc from the contacts to the conductors.

In another aspect, an apparatus, such as an electrical system, is provided. The electrical system can include a pair of conductors across which an arc is sporadically supported. An energy source can be configured to selectively charge an electrode assembly so as to establish an electric field in the vicinity of the arc that is constant in time. The conductors and electrode assembly can be configured such that the arc, when present, will be lengthened or constricted due to the electric field. For example, the electrical system can include an indication device that is operatively coupled to the energy source, the indication device providing an indication that the arc will be imminently established. The energy source can be configured to charge the electrode assembly in response to receiving the indication.

DRAWINGS

The following detailed description should be read with reference to the accompanying drawings in which like characters represent like parts throughout the drawings, wherein.

DETAILED DESCRIPTION

Figure 1:
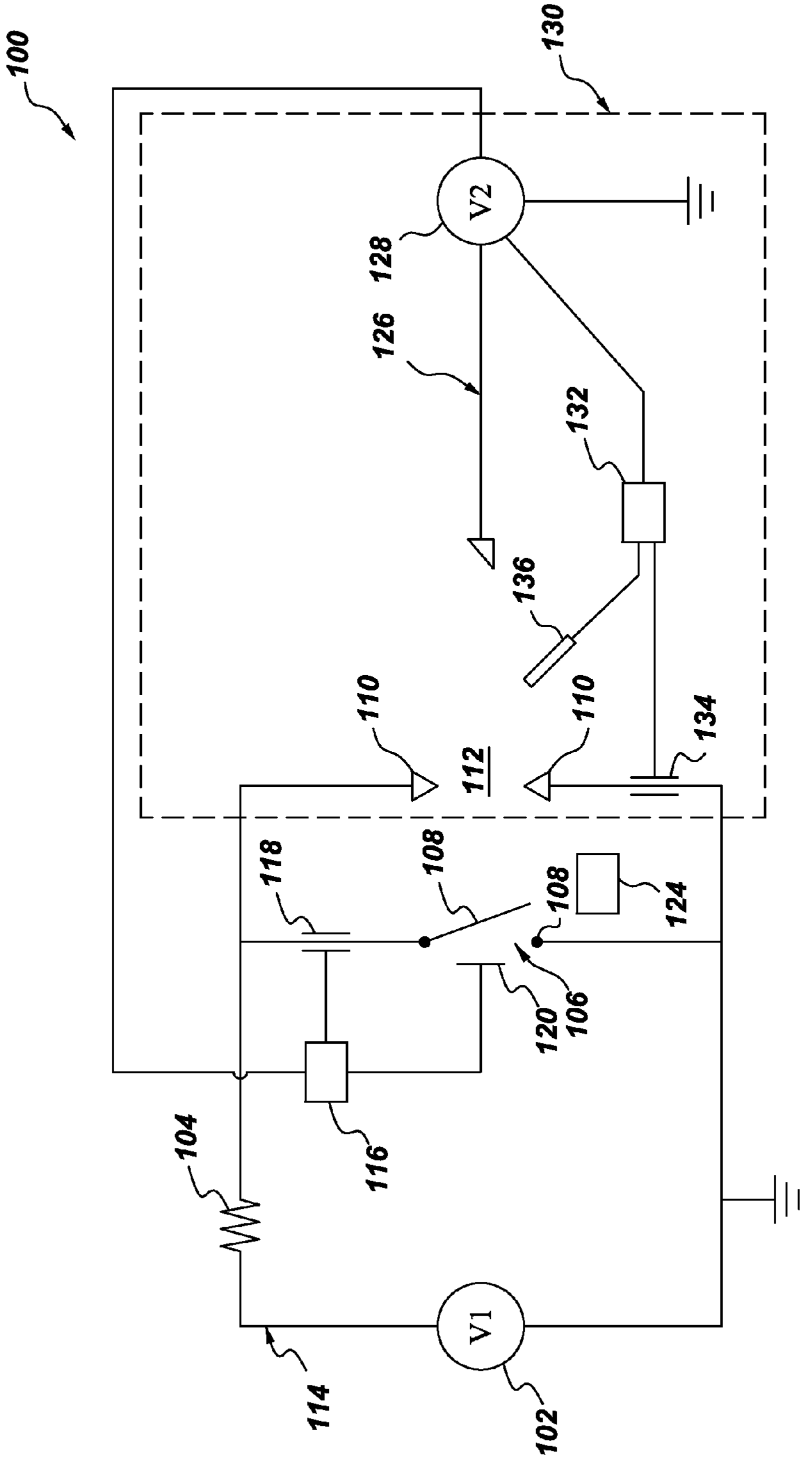
FIG. 1 is a schematic view of an electrical system configured in accordance with an example embodiment.

Example embodiments are described below in detail with reference to the accompanying drawings, where the same reference numerals denote the same parts throughout the drawings. Some of these embodiments may address the above and other needs.

Referring to FIG. 1, therein is shown an electrical system 100. The system 100 can include an energy source, such as the voltage source 102, connected across an electrical load 104. The load 104 may be connected in series with a switch 106 (e.g., an electromechanical switch) having a pair of contacts 108 configured to move into and out of contact with one another. The system 100 can further include a pair of conductors 110. Each conductor 110 can be electrically connected to a respective side of the switch 106 (for example, to a respective contact 108), and can be disposed so as to form a gap 112 therebetween. The voltage source 102, load 104, switch 106, and conductors can together be considered the load circuit 114.

Figure 2:
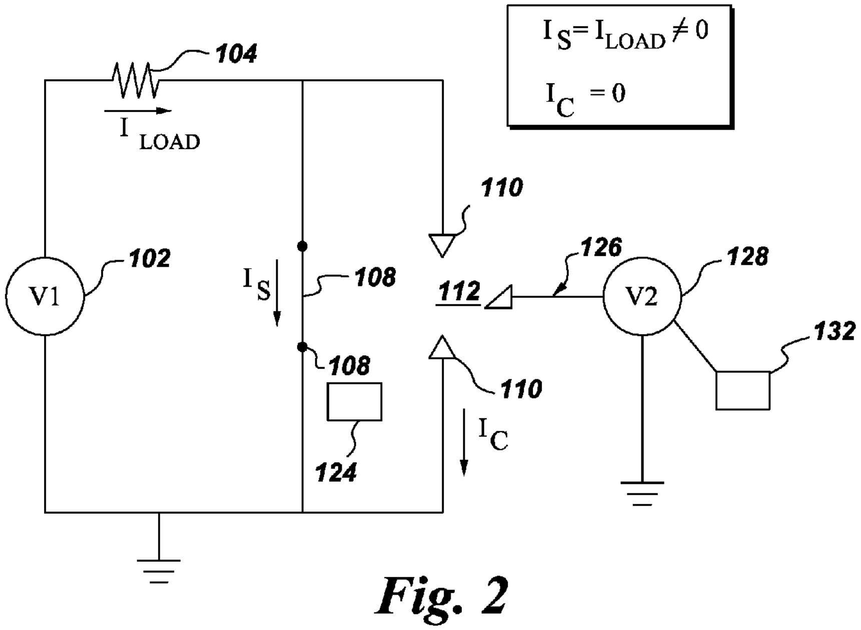
FIGS. 2-5 are schematic views of the electrical system of FIG. 1 demonstrating example operations of the system.
Figure 3:
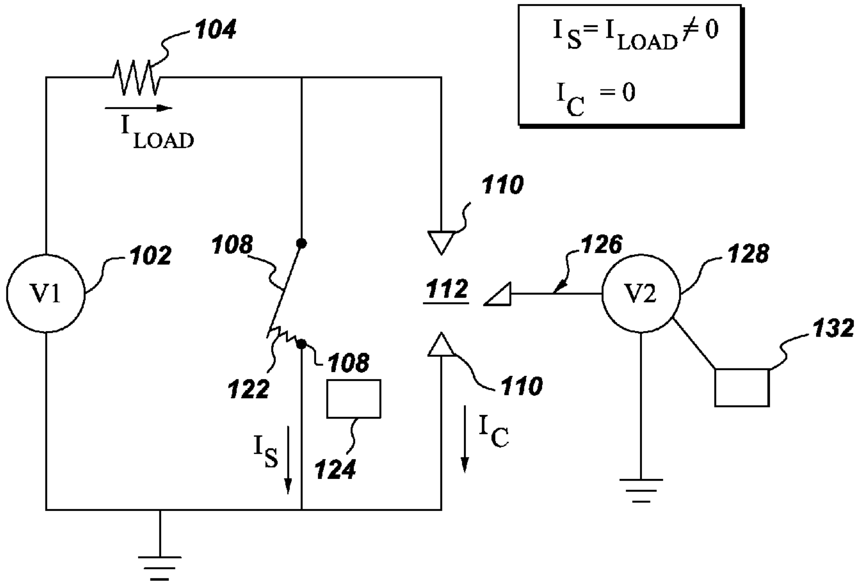

Referring to FIGS. 1-3, generally, the switch 106 can be utilized to control the operation of the load circuit 114. Specifically, as the switch 106 opens and closes (that is, as the contacts 108 come out of and into contact, respectively), and assuming there is nothing to bridge the gap 112 between the conductors 110, the load circuit 114 correspondingly opens and closes (in some cases, the load circuit may include several branches, only some of which are controlled by the switch). To enable selective opening and closing of the switch 106, the system 100 may include a switch controller 116 that, for example, monitors conditions in the load circuit 114 and selectively opens the switch 106, say, upon detection of a fault in the load circuit. In one embodiment, the switch controller 116 may include a current monitor 118 that provides an indication of the current in the load circuit 114. The switch controller 116 may determine from the current indication that the switch 106 should be opened and may send a signal, say, to a gate 120 of the switch to initiate switch opening.

While the above describes a process for opening and closing the switch 106, in practice, the current in the load circuit may not be modulated directly upon opening and closing of the switch. Rather, if the switch 106 is in a closed position and a current is passing through the load circuit 114 (e.g., the current $I_{LOAD}$ in FIG. 2, which is equal to the current $I_S$ passing through the switch), then upon opening the switch, the current through the load circuit $I_{LOAD}$ will not immediately go to zero. Instead, an arc 122 may form between the contacts 108 (as shown, for example, in FIG. 3), thereby allowing a nonzero current $I_S$ to continue to flow through the switch 106.

Figure 4:
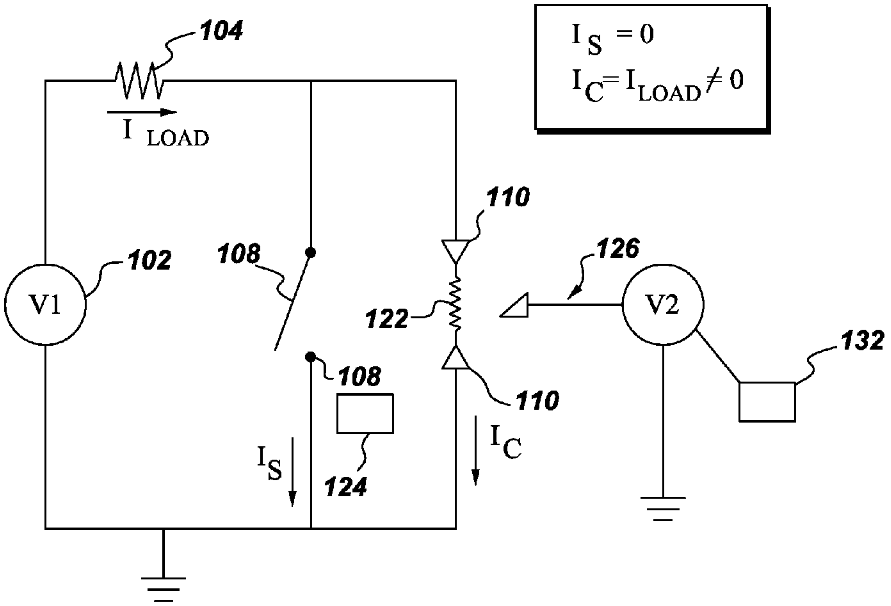

Referring to FIGS. 1-4, the system 100 can also include an arc transfer device 124. The arc transfer device 124 can be configured to urge the arc 122, once established between the contacts 108, to the conductors 110, such that the arc may sporadically span the gap 112 and the current through the conductors $I_C$ is the load current $I_{LOAD}$ (as illustrated in FIG. 4). For example, the arc transfer device may include an ablative plasma gun configured to temporarily generate a plasma in the gap 112, thereby creating a path of lower impedance than across the contacts 108 for the electromagnetic energy in the arc. Examples of ablative plasma guns that might be incorporated into the system 100 include, but are not limited to, those discussed in U.S. Pat. No. 7,821,749 and U.S. Patent Application Publication Nos. 2010/0301021, 2009/0308845, and 2009/0134129, the contents of which are incorporated herein by reference in their entireties. In another embodiment, the arc transfer device may include an arc runner or arc chute, examples of which devices are discussed in U.S. Pat. Nos. 7,705,263; 7,830,232; and 7,812,276, the contents of which are incorporated herein by reference in their entireties. The arc transfer device may be configured to monitor the conditions of the load circuit in order to be selectively operable when the arc is present (e.g., where the arc transfer device includes an ablative plasma gun, activating the ablative plasma process only when necessary). Alternatively, the arc transfer device may be a passive device that is inherently operable whenever the arc is present, for example, as where the arc transfer device is driven by the energy present in the arc; see, for example, U.S. Pat. No. 6,100,491, the content of which is incorporated herein by reference in its entirety.

Referring again to FIG. 1, the system 100 can also include an electrode assembly 126 and an energy source, such as the voltage source 128. The voltage source 128 can be separate from the load circuit 114 (although in some cases, the voltage source and load circuit may share a common ground connection), and can be configured to selectively charge the electrode assembly 126. Further details regarding the selective charging of the electrode assembly 126 are provided below. The conductors 110, electrode assembly 126, and voltage source 128 are together generally referred to as the current interruption module 130.

Figure 5:
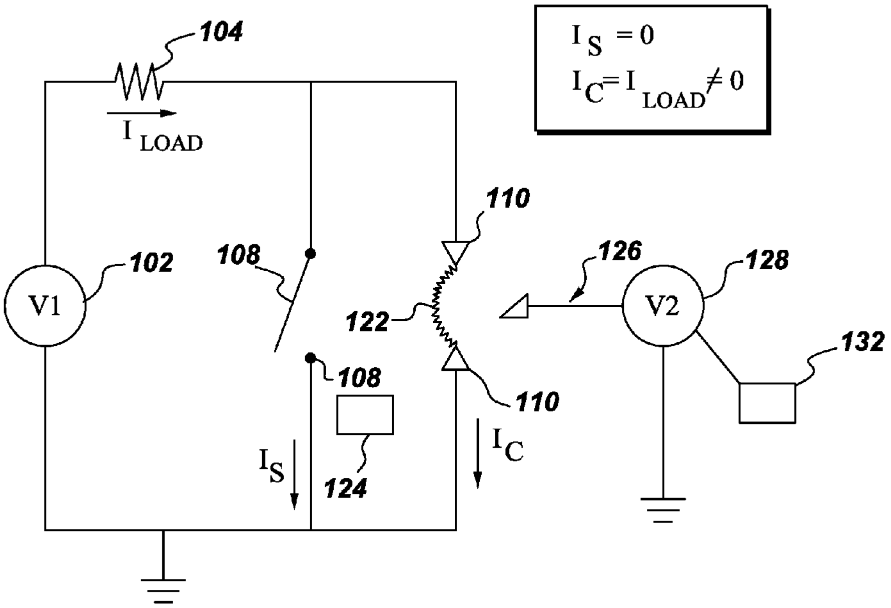
Figure 6:
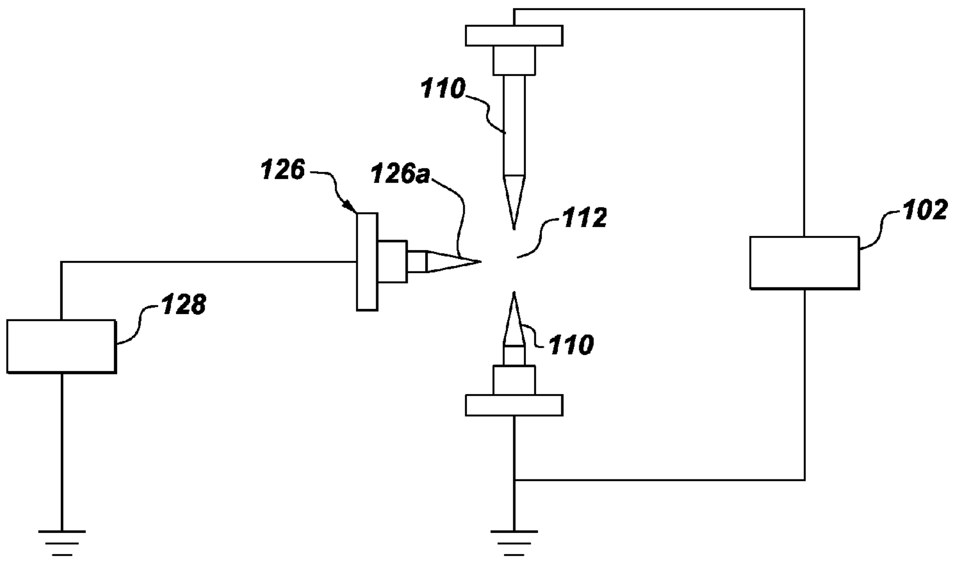
FIG. 6 is a magnified schematic view of an example embodiment of the electrode assembly of FIG. 1.
Figure 7:
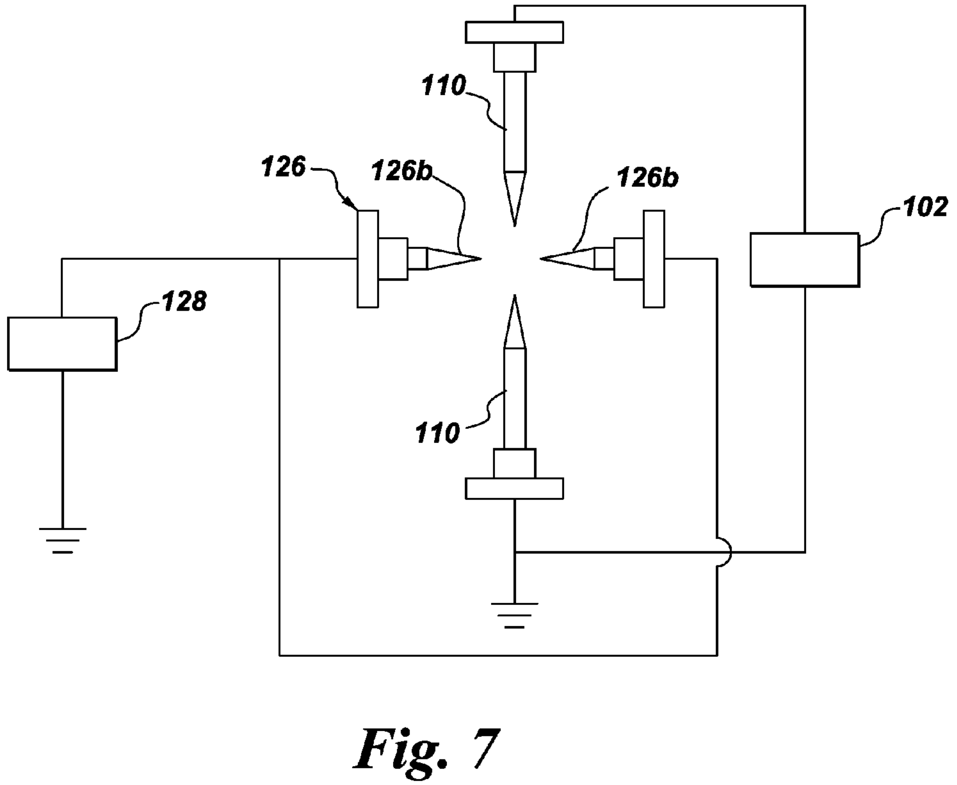
FIG. 7 is a magnified schematic view of another example embodiment of the electrode assembly of FIG. 1.
Figure 8:
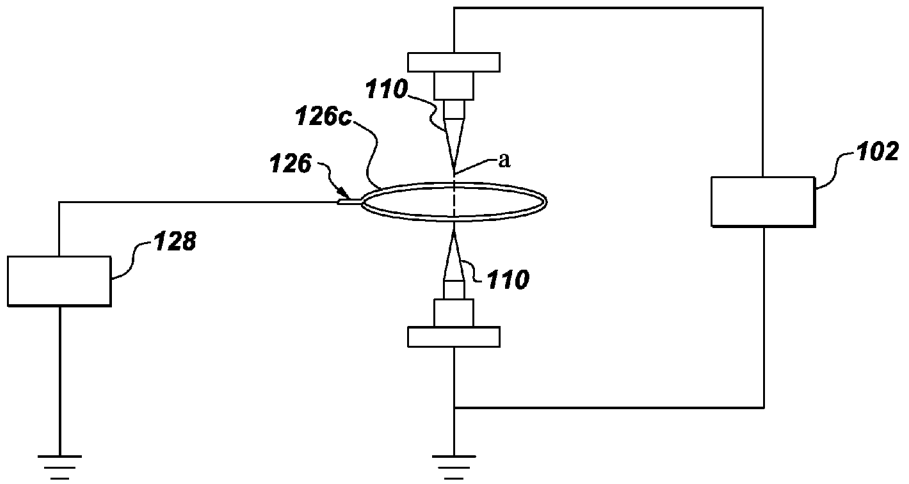
FIG. 8 is a magnified schematic view of yet another example embodiment of the electrode assembly of FIG. 1.

Referring to FIGS. 1, 4, and 5, as mentioned above, the arc 122 may be established between the contacts 108 and then moved to be supported by the conductors 110. The conductors 110 and electrode assembly 126 may be configured such that, when the arc 122 is present across the conductors, the configuration of the arc will be modified due to the charge on the electrode assembly so as to increase the overall impedance of the arc. For example, the conductors 110 and electrode assembly 126 may be configured such that the arc 122 is lengthened due to the charge on the electrode assembly (as illustrated in FIG. 5). Alternatively, or additionally, the arc 122 may be transversely constricted due to the charge on the electrode assembly 126, thereby reducing the width of the arc. Overall, the modification of the configuration of the arc 122 can result in an increase in the impedance of the arc 122 sufficient to cause the arc to be extinguished.

The voltage source 128 can be configured to provide a high voltage pulse when the arc 122 is present. For example, the system 100 may include an indication device 132 operatively coupled to the voltage source 128. The indication device 132 may be configured to provide an indication of the arc 122 being established. For example, the indication device 132 may include a current monitor 134 and/or an optical sensor 136 that, respectively, monitor current through the conductors 110 (indicating the presence of the arc 122) and optically monitor the gap 112 for the presence of the arc. In response to detecting the arc 122, the indication device can provide the indication of the arc to the voltage source 128 so as to initiate charging of the electrode assembly 126. Alternatively, the indication device 132 may be excluded, and the switch controller 116 may communicate with the voltage source 128 to initiate charging of the electrode assembly 126, for example, at a predetermined time after opening of the switch 106.

In another embodiment, the voltage source 128 can be configured to selectively charge the electrode assembly 126 so as to establish an electric field in the vicinity of the arc 122 that is substantially constant in time. For example, the arc 122 may be shielded from the electrode assembly 126 during the time that the electrode assembly is being charged (e.g., while the voltage from the voltage source 128 is ramping). Alternatively, the system 100 can be configured such that the voltage source 128 applies a charge to the electrode assembly 126 prior to formation of the arc 122. For example, the switch controller 116 may be configured to send a signal to the voltage source 128 indicative of an impending need to open the switch 106, and the voltage source can initiate charging prior to switch opening, such that the charge on the electrode assembly 126 reaches a steady state before the arc 122 is formed.

Referring to FIGS. 1, 4, and 6-8, the electrode assembly 126 can be configured in a variety of ways in order to produce a change in the configuration of the arc 122 that might increase the impedance of the arc. For example, the electrode assembly 126 may include a single electrode 126*a* that is laterally offset from the gap 112. The location of the electrode 126*a* relative to the conductors 110 may be varied depending on, for example, the potential difference between the conductors 110 (and the polarity of that charge difference), the charge on the electrode 126*a*, and/or the current associated with the arc 122. Applicants have experimentally determined that disposing the electrode 126*a* so as to be about centered along (but laterally offset from) the axis $\alpha$ defined between the conductors 110, and placing a positive or negative charge on the electrode, may result in an enhanced arc impedance increase relative to other configurations, but a variety of other configurations are expected to induce an increase in arc impedance. Where the electrode 126*a* is not centered along the axis $\alpha$, arc impedance increases induced by the electrode may be enhanced by placing the electrode closer to the conductor 110 having opposite charge to the electrode. In another embodiment, the electrode assembly 126 can include a pair of electrodes 126*b* disposed on opposing sides of the gap 112. Both of the electrodes 126*b* can be in communication with one side of the voltage source 120 such that the electrodes are selectively charged similarly. Alternatively, the electrodes 126*b* can be connected to opposite sides of the voltage source 120 to produce a potential difference between the electrodes. In still another embodiment, the electrode assembly 126 may include an annular or ring-shaped electrode 126*c* that extends around an axis $\alpha$ defined between the conductors 110.

Figure 9:
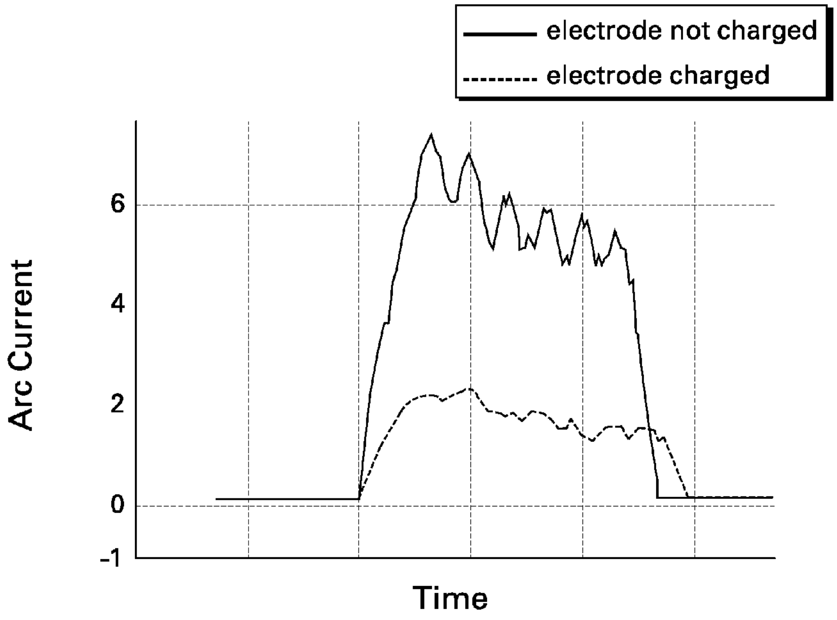
FIG. 9 is a schematic plot of arc current as a function of time for a charged and uncharged electrode assembly.

Applicants have experimentally determined that configurations of the electrode assembly 126 consistent with the above discussion may, when charged in the vicinity of conductors 110 supporting an arc 122, significantly reduce the instantaneous current associated with the arc (for example, by 65-70%) relative to a situation where the charged electrode assembly is not present. Referring to FIG. 9, therein is shown a schematic plot of arc current data collected by Applicants for the system configuration illustrated in FIG. 6. The plot displays arc current (in generic units) as a function of time (also in generic units) for situations where a charge is applied to the electrode 126*a* (in the form of a roughly 9 kV voltage, provided, say, statically or as a pulse) and where no charge is applied. As seen in FIG. 9, the arc current is roughly 65-70% less when a charge is applied to the electrode 126*a*.

Without being bound to any particular theory, the charged electrode assembly 126 establishes an electric field $\vec{E}$ in the vicinity of the arc 122. The electrons defining the arc 122 travel through the field $\vec{E}$, and as a result, a force $\vec{F}_E$ acts on the electrons. Due to the influence of both the force $\vec{F}_E$ and the magnetic field $\vec{B}$ that is established by the movement of the electrons of the arc 122, the electrons assume a helical trajectory. The helical trajectory can be thought of as the superposition of a circular motion around a point. called the "guiding center," and a relatively slower drift of the guiding center. If the velocity of the guiding center is $\vec{v}_G$, then some portion of the velocity $\vec{v}_G$ can be attributed to the force $\vec{F}_E$. This electric field-induced guiding center velocity $\vec{v}_F$ is described by $$\vec{v}_F = \frac{\vec{E}\times\vec{B}}{B^2} \tag{1}$$

From Equation (1), it is apparent that the electrons (and, thus, the arc 122) will, on average, have a component of velocity perpendicular to both the electric field $\vec{E}$ and the magnetic field $\vec{B}$. The arc 122 may therefore be urged into a configuration other than that in which the constituent electrons follow the path of lowest impedance between the conductors 110. It is noted that, as the electrode assembly 126 is charged, the configuration of the arc 122 may also be affected by the magnetic field induced by the varying electric field.

Figure 10:
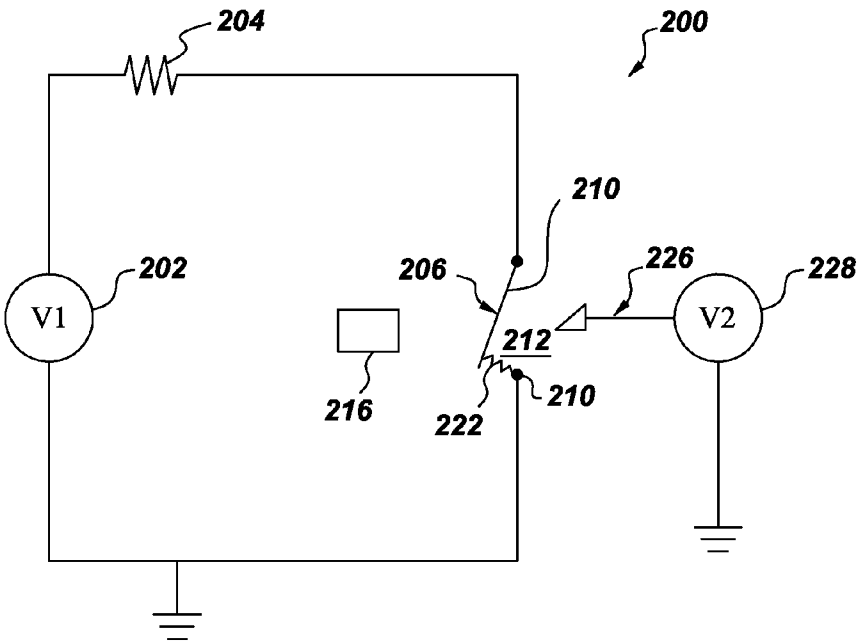
FIG. 10 is a schematic view of an electrical system configured in accordance with another example embodiment.

Referring to FIG. 10, therein is shown an electrical system 200 configured in accordance with another example embodiment. The system 200 can include an energy source, such as the voltage source 202, connected across an electrical load 204. The load 204 may be connected in series with a switch 206 (e.g., an electromechanical switch) having a pair of conductors 210 that are configured to move into and out of contact with one another; that is, the conductors act as contacts for the switch. When the conductors 210 are separated, a gap 212 can be defined therebetween. A switch controller 216 may enable selective opening and closing of the switch 206.

The system 200 can also include an electrode assembly 226 that may selectively charged by an energy source, such as the voltage source 228. As discussed previously, a current passing through the switch 206 may not halt immediately upon opening the switch, but may continue in the form of an arc 222 that spans the gap 212. The electrode assembly 226 may be disposed relative to the conductors 210 such that, when the arc 222 is present across the conductors, the configuration of the arc will be modified due to the charge on the electrode assembly so as to increase the overall impedance of (and ultimately extinguish) the arc. As such, the arc 222 need not be moved to from the conductors 210 to another set of conductors before being extinguished.

While only certain features of the invention have been illustrated and described herein, many modifications and changes will occur to those skilled in the art. For example, while the electrical systems described herein have involved electric fields that are utilized to increase the impedance of an arc, the systems may additionally include permanent or electromagnets that also serve to modify the configuration of an arc so as to increase the impedance thereof. It is, therefore, to be understood that the appended claims are intended to cover all such modifications and changes as fall within the true spirit of the invention.

What is claimed:

1. An apparatus comprising:

a pair of conductors across which an arc is sporadically supported, the arc including load current from a load circuit connected in series with the pair of conductors;

an electrode assembly disposed in proximity to the pair of conductors; and an energy source coupled to the electrode assembly and configured to selectively charge the electrode assembly prior to formation of the arc so as to establish an electric field in a vicinity of the arc that is constant in time, wherein the proximity of the electrode assembly to the pair of conductors and establishment of the electric field in the vicinity of the arc result in an increase in an impedance of the arc across the pair of conductors such that the increase in the arc impedance is sufficient to extinguish the arc present across the pair of conductors.

2. The apparatus of claim 1, wherein the electrode assembly includes a pair of electrodes disposed on opposing sides of a gap defined between the pair of conductors.

3. The apparatus of claim 1, wherein the electrode assembly includes an electrode that is centered along, and laterally offset from an axis defined between the pair of conductors.

4. The apparatus of claim 1, wherein the energy source selectively provides a high voltage pulse to charge the electrode assembly prior to formation of the arc.

5. The apparatus of claim 1, wherein the pair of conductors is configured to move into and out of contact with one another so as to respectively close or open at least a portion of the load circuit.

6. The apparatus of claim 1, further comprising a switch, wherein the switch comprises a pair of contacts configured to move into and out of contact with one another so as to respectively close or open at least a portion of the load circuit, wherein each conductor of the pair of conductors is electrically connected to a respective one of the pair of contacts, and wherein the pair of conductors is configured to receive therebetween the arc from the pair of contacts subsequent to the arc being established between the pair of contacts.

7. The apparatus of claim 6, further comprising an arc transfer device configured to urge the arc from the pair of contacts to the pair of conductors.

8. The apparatus of claim 6, further comprising a switch controller operatively coupled to the energy source, wherein the switch controller is configured to communicate a signal to the energy source, and wherein the signal is indicative of an impending need to open the switch.

9. The apparatus of claim 8, wherein the energy source is configured to charge the electrode assembly prior to the formation of the arc in response to the signal.

10. The apparatus of claim 1, wherein the arc impedance is increased by one of lengthening of the arc or constriction of the arc.

11. In an apparatus comprising a pair of conductors to sporadically support an arc including load current from a load circuit connected in series with the pair of conductors; an electrode assembly; and an energy source configured to selectively charge the electrode assembly; a method comprising:

(i) disposing the electrode assembly in proximity to the pair of conductors; and (ii) charging selectively the electrode assembly by the energy source prior to formation of the arc so as to establish an electric field in a vicinity of the arc that is constant in time, wherein charging selectively the electrode assembly disposed in proximity to the pair of conductors results in increasing an impedance of the arc across the pair of conductors such that the increase in the arc impedance is sufficient to extinguish the arc present across the pair of conductors.

12. The method of claim 11, wherein the step (ii) comprises:

receiving an indication that the arc will be imminently established; and charging the electrode assembly prior to formation of the arc in response to receiving the indication.

13. The method of claim 11, wherein the step (ii) comprises providing selectively by the energy source a high voltage pulse to charge the electrode assembly.

14. The method of claim 11, wherein the electrode assembly includes a pair of electrodes disposed on opposing sides of a gap defined between the pair of conductors.

15. The method of claim 11, wherein the electrode assembly includes an electrode that is centered along, and laterally offset from an axis defined between the pair of conductors.

16. The method of claim 11, further comprising moving the pair of conductors into and out of contact with one another so as to respectively close or open at least a portion of the load circuit.

17. The method of claim 11, further comprising receiving the arc between the pair of conductors from a switch comprising a pair of contacts subsequent to the arc being established between the pair of contacts, wherein the pair of contacts is configured to move into and out of contact with one another so as to respectively close or open at least a portion of the load circuit, and wherein each conductor of the pair of conductors is electrically connected to a respective one of the pair of contacts.

18. The method of claim 17, wherein receiving the arc comprises urging the arc from the pair of contacts to the pair of conductors by an arc transfer device.

19. The method of claim 11, wherein the arc impedance is increased by one of lengthening of the arc or constriction of the arc.

* * * * *